US011130268B1

(12) United States Patent
Carmein

(10) Patent No.: US 11,130,268 B1
(45) Date of Patent: Sep. 28, 2021

(54) METHODS AND SYSTEMS FOR PRODUCING A PRODUCT UTILIZING A LINER

(71) Applicant: Protolabs, Inc., Maple Plain, MN (US)

(72) Inventor: David Carmein, Mound, MN (US)

(73) Assignee: Protolabs, Inc., Maple Plain, MN (US)

( * ) Notice: Subject to any disclaimer, the term of this patent is extended or adjusted under 35 U.S.C. 154(b) by 50 days.

(21) Appl. No.: 16/934,868

(22) Filed: Jul. 21, 2020

(51) Int. Cl.
*B29C 45/40* (2006.01)
*B29C 45/44* (2006.01)

(52) U.S. Cl.
CPC .......... *B29C 45/4005* (2013.01); *B29C 45/40* (2013.01); *B29C 2045/4057* (2013.01); *B29C 2045/4063* (2013.01); *B29C 2045/4068* (2013.01); *B29C 2045/4089* (2013.01); *B29C 2045/4492* (2013.01)

(58) Field of Classification Search
CPC ................ B29C 45/4005; B29C 45/43; B29C 2045/4063; B29C 2045/4068; B29C 45/4089; B29C 31/006; B29C 33/34; B29C 33/36; B29C 45/1756; B29C 45/1757; B29C 45/1758; B29C 45/2606; B29C 45/2675; B29C 45/2677; B29C 2045/4078; B29C 2045/4084; B29C 33/46; B29C 2043/5053; B29C 2043/5061; B29C 2045/4057; B29C 45/435; B29C 2045/4492; B29C 45/44; B29C 33/444; B29C 37/0017
See application file for complete search history.

(56) References Cited

U.S. PATENT DOCUMENTS

| 3,768,940 A | 10/1973 | Valyi |
| 3,970,732 A | 7/1976 | Slaats et al. |
| 4,438,065 A * | 3/1984 | Brown .................... B29C 45/43 |
| | | 264/335 |
| 4,727,922 A | 3/1988 | Miyasawa |
| 5,632,320 A | 5/1997 | Atmur et al. |

(Continued)

FOREIGN PATENT DOCUMENTS

| EP | 2229272 A1 | 9/2010 |
| EP | 2764935 A1 | 8/2014 |
| GB | 524383 A | 8/1940 |

*Primary Examiner* — Jeffrey M Wollschlager
*Assistant Examiner* — Armand Melendez
(74) *Attorney, Agent, or Firm* — Caldwell Intellectual Property Law, LLC

(57) ABSTRACT

A method of producing a product utilizing a liner. The method comprises securing, at an injection molding manufacturing system, a liner to a first half of a mold. The method further comprises clamping, at an injection molding manufacturing system, the first half of the mold to a second half of the mold, wherein clamping the first half of the mold to a second half of the mold generates a total mold. The method further comprises generating, at an injection molding manufacturing system, a formed product, wherein generating the formed product further comprises filling an opening of the total mold with a molten material. The method further comprises ejecting, at an injection molding manufacturing system, the formed product, and the liner from a completed first half of the mold and releasing, at an injection molding manufacturing system, the formed product from the liner.

8 Claims, 13 Drawing Sheets

(56) References Cited

U.S. PATENT DOCUMENTS

| | | | |
|---|---|---|---|
| 5,932,164 A * | 8/1999 | Allen | B29C 45/40 |
| | | | 264/328.1 |
| 6,981,864 B2 | 1/2006 | Bassi | |
| 2006/0027314 A1 | 2/2006 | Jones et al. | |
| 2012/0273985 A1 | 11/2012 | Luepke et al. | |
| 2013/0243897 A1* | 9/2013 | McCready | B29C 49/02 |
| | | | 425/537 |
| 2014/0228997 A1 | 8/2014 | Phillips et al. | |
| 2015/0144284 A1 | 5/2015 | Snyder et al. | |
| 2017/0334093 A1* | 11/2017 | De Almeida | B29C 45/44 |

\* cited by examiner

METHODS AND SYSTEMS FOR PRODUCING A PRODUCT UTILIZING A LINER

FIELD OF THE INVENTION

The present invention generally relates to the field of injection molding. In particular, the present invention is directed to methods and systems for producing a product utilizing a mold liner.

BACKGROUND

Many types of objects are manufactured utilizing injection molding. The injection molding manufacturing process works by injecting molten material into a hollow cavity of a two-part mold. The molten material can include a variety of materials, typically being thermoplastic polymers, thermosetting polymers, metals, glasses, and elastomers. The molten material cools within the hollow cavity, creating a completed part. The two parts of the mold are separated and the completed part remains adhered to one half of the mold. Ejector pins are used to remove the completed part from one half of the mold by pushing up from the surface of the mold and engaging the bottom of the completed part. However, utilizing ejector pins to release the completed part during the injection molding manufacturing process generates a high level of complexity to mold set. Additionally, ejector pins create imperfections in the completed part because each ejector pin utilized will leave a mark where the pin contacted the completed part.

SUMMARY OF THE DISCLOSURE

In an aspect, a method of producing a product utilizing a liner is disclosed. The method comprises guiding, by an injection molding manufacturing system, a collar lock onto a first half of a mold, wherein the collar lock comprises a liner. The method further comprises clamping, at an injection molding manufacturing system, the first half of the mold to a second half of the mold, wherein clamping the first half of the mold to a second half of the mold generates a total mold. The method further comprises generating, at an injection molding manufacturing system, a formed product, wherein generating the formed product further comprises filling an opening of the total mold with a molten material. The method further comprises ejecting, by the injection molding manufacturing system, the formed product, the collar lock, and the liner from a completed first half of the mold and releasing, at an injection molding manufacturing system, the formed product from the liner.

In another aspect a system for producing a product utilizing a liner is disclosed. The system comprising an injection molding manufacturing system, wherein the injection molding manufacturing system is configured to guide a collar lock onto a first half of a mold, wherein the collar lock comprises a liner. The system is further configured to clamp the first half of the mold to a second half of the mold, wherein clamping the first half of the mold to a second half of the mold generates a total mold. The system is further configured to generate a formed product, wherein generating the formed product further comprises filling an opening of the total mold with a molten material. The system is further configured to eject the formed product, the collar lock, and the liner from a completed first half of the mold and release the formed product from the liner.

In another aspect, a method of producing a product utilizing a first liner and a second liner is disclosed. The method comprises guiding, by an injection molding manufacturing system, a first collar lock onto a first half of a mold, wherein the first collar lock comprises a first liner. The method further comprises guiding, by an injection molding manufacturing system, a second collar lock onto a second half of the mold, wherein the second collar lock comprises a second liner. The method further comprises clamping, at the injection molding manufacturing system, the first half of the mold to a second half of the mold, wherein clamping the first half of the mold to a second half of the mold generates a total mold. The method further comprises generating, by the injection molding manufacturing system, a formed product, wherein generating the formed product further comprises filling an opening of the total mold with a molten material. The method further comprises ejecting, by the injection molding manufacturing system, the formed product from a completed first half of the mold and a completed second half of the mold and releasing, by the injection molding manufacturing system, the formed product from the first liner and the second liner.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
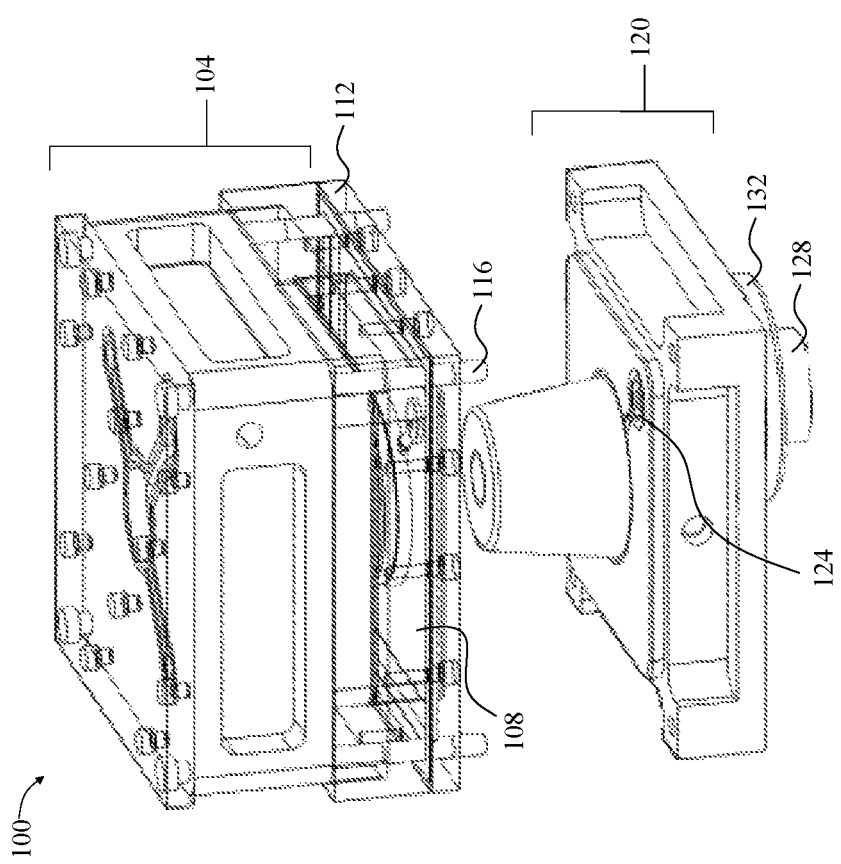
FIGS. 1A-B are perspective views of an exemplary embodiment of an injection molding manufacturing system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for producing a product utilizing a liner. In an embodiment, a formed product may be generated by utilizing a liner. In this way, reduced complexity of the mold of the product and reduced imperfections in the formed product are achieved. The formed product is generated by guiding a liner and collar lock assembly to the first half of the mold of the product, clamping the first half of the mold of the product to the second half of the mold of the product, and filling the opening of the total mold with a molten material, wherein filling the opening generates the formed product. The formed product is released from the liner after being ejected from a completed first half of the mold of the product. In an embodiment, the formed product may be generated utilizing an injection molding manufacturing process.

Embodiments of the present system and method include the performance of manufacturing processes. In some embodiments, a manufacturing process is a process used to form a product, which may be an end-product or a part used to assemble an end-product, by the performance of one or more manufacturing steps. A first half of a mold of the product and a second half of the mold of the product can be configured to create a total mold. The total mold includes an opening. As used herein, the opening of the mold will provide the shape and/or dimensions for the product when one or more manufacturing step has been performed. One or more steps in the production of the product may include physical modifications to the first half of the mold of the product and/or the second half of the mold of the product, such as the addition of a liner. The addition of a liner facilitates removal of the product from the mold following manufacture while ensuring the integrity of the product.

One or more steps may include an injection molding manufacturing process, in which molten material fills an opening of the total mold. In some embodiments, an injection molding manufacturing process is a process in which material is fed into a heated barrel, mixed to generate the molten material, and the molten material is injected into a hollow space. The molten material can then harden to the configuration of the hollow space. An "injection molding manufacturing system", as used in the entirety of this disclosure, is the machine for producing a product utilizing the injection molding manufacturing process. In an embodiment, the injection molding manufacturing system may include a horizontal and/or vertical configuration of all components of the injection molding manufacturing system. Injection molding manufacturing system may include any configuration suitable for use in injection molding manufacturing system. Injection molding manufacturing system may include any driving system, wherein the driving system powers the injection molding manufacturing system. For example and without limitation, the driving system of injection molding manufacturing system may include a hydraulic process, mechanical process, electric process, hybrid process, and/or any combination thereof.

The injection molding manufacturing system can further be configured to include a press with a fixed side. A fixed side of a press, as used in this disclosure, is the side of the press of the injection molding manufacturing system that remains stationary for the duration of the injection molding manufacturing process. In an embodiment, the fixed side of the press is responsible for heating the material, wherein the addition of heat to the material generates a molten material. The molten material is inserted into a barrel, with the barrel containing the mechanisms for heating and/or transporting the molten material to a nozzle. The nozzle can be configured to inject the molten material into the mold. The material may be heated and transported through the barrel to the nozzle utilizing any suitable method. For example and without limitation, the barrel may be configured to utilize a hydraulically powered ram. The ram can force the material through a heated section generating a molten material. As a further example and without limitation, the barrel may be configured to utilize a reciprocating screw. The reciprocating screw can move the material forward by both rotating and sliding axially and generates the molten material by pressure, friction, heaters surrounding the barrel, and/or any combination thereof. The nozzle of the injection molding manufacturing system, as used in this disclosure, is a component used to transfer the molten material from the barrel and into the mold. The nozzle may include any suitable nozzle, as described in the entirety of this disclosure. The nozzle may include any configuration of taper determined to be suitable for the injection molding manufacturing process. For example and without limitation, the nozzle of the injection molding manufacturing system may include an open nozzle, shut-off nozzle, and/or any combination thereof.

The injection molding manufacturing system is further configured to include a moving clamp side of the press. The moving clamp side of the press, as used in this disclosure, is the side of the press of the injection molding manufacturing system that has movement towards and away from the fixed side of the press of the injection molding manufacturing system. The moving clamp side of the press may be configured to generate movement in any method suitable for use in the injection molding manufacturing system, as described in the entirety of this disclosure. For example and without limitation, the moving side of the clamp may move towards and/or away from the fixed side of the press of the injection molding manufacturing system by utilizing a hydraulic powering system.

Figure 1B:
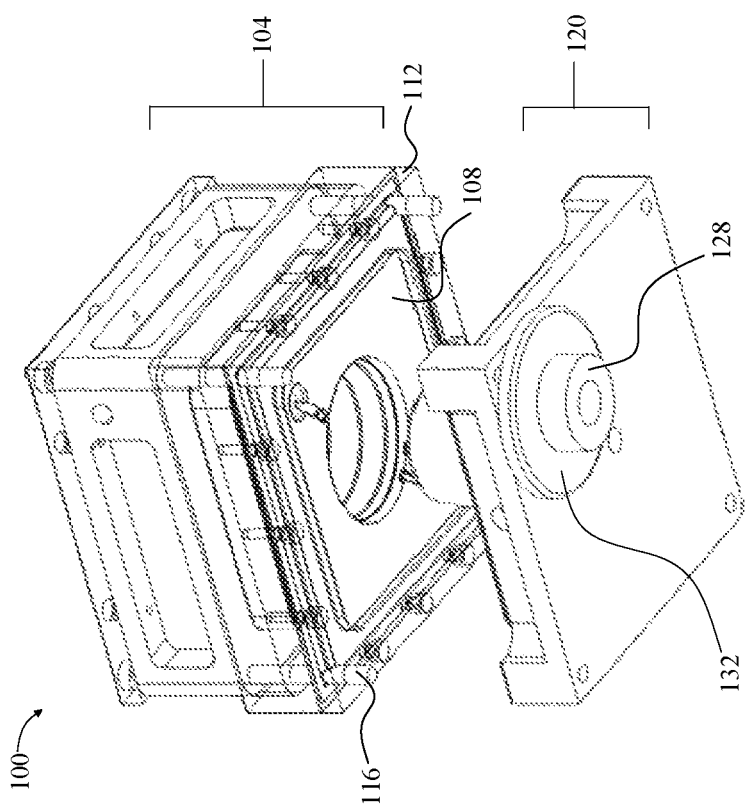

Referring now to the drawings, FIGS. 1A-B illustrate perspective views of system 100 for producing a product utilizing a liner. The configuration of system 100 is merely exemplary and should in no way be considered limiting. System 100 is configured to generate a formed product and release the formed product from the liner. System 100 is configured to determine a response characteristic of each lattice cell of the plurality of lattice cells and can include first half of the mold 104, liner 108, collar lock 112, alignment pin 116, second half of the mold 120, remover ring 124, sprue bushing 128, guide ring 132, and any combination thereof.

Still referring to FIGS. 1A-B, system 100 is designed and configured to include first half of a mold 104. A "first half of a mold", as used in this disclosure, is the half of the mold of the product attached to the moving clamp side of the press of the injection molding manufacturing system. As presented in FIGS. 1A-B, the configuration of first half of the mold 104 is merely exemplary and should in no way be considered limiting. First half of the mold 104 may include a cavity, core, and/or any combination thereof, on a bottom face. The bottom face can include the face of first half of the mold 104 which is opposite and opposing to the face attached to the moving side of the press of the injection molding manufacturing system. A "cavity," as used in this disclosure is a depression in the mold of the product, wherein the depression creates the external surface of the product. A "core," as used in this disclosure, is an extended portion of the mold of the product, wherein the extended portion creates the internal surface of the product. For example and without limitation, first half of the mold 104 may include a plurality of cavities. Each cavity of the plurality of cavities may be identical and/or unique in shape. As a further example without limitation, first half of the mold 104 may include a plurality of cores. Each core of the plurality of cores may also be identical and/or unique in shape. First half of the mold 104 may be composed utilizing any material that may be considered a suitable material. For example and without limitation, first half of the mold 104 may be composed utilizing metals, such as hardened steel, pre-hardened steel, aluminum, beryllium-copper alloy, and/or any combination thereof. First half of the mold 104 may be manufactured utilizing any machining process, such as, for example, subtractive manufacturing. Persons skilled in the art, upon reviewing the entirety of this disclosure, will be aware of various materials which may be suitable for use as the first half of the mold consistently with this disclosure.

With continued reference to FIGS. 1A-B, first half of the mold 104 may include a through-hole. A "through-hole," as used in this disclosure, is a hole through first half of the mold 104 that includes an opening. The opening of the hole can be located on the bottom face of first half of the mold 104. The through-hole can be designed and configured to be filled by alignment pin 116. The diameter of the at least a through-hole is directly correlated to the diameter of at least one alignment pin 116. For example and without limitation, if the diameter of an alignment pin 116 is 2 mm, the diameter of the through-hole will also be 2 mm. As a further non-limiting example, if the diameter of alignment pin 116 is 0.25", the diameter of the through-hole will also be 0.25". Persons skilled in the art, upon reviewing the entirety of this disclosure, will be aware of various holes which may be suitable for use as the at least a through-hole consistently with this disclosure.

Continuing to refer to FIGS. 1A-B, system 100 is further designed and configured to include liner 108. A "liner," as used in this disclosure, is a sheet of material conformally mated to first half of the mold 104. The configuration of liner 108 is merely exemplary and should in no way be considered limiting. Liner 108 is designed and configured to ease in the facilitation of removing a formed product from a completed first half of the mold while minimizing the imperfections in the surface of the formed product. Liner 108 can be configured to conform to the shape of the bottom face of first half of the mold 104, including every detail of the surface of the bottom face of first half of the mold 104. In an embodiment, liner 108 preserves the angles between each directed curve of the plurality of directed curves and preserves the orientation. Liner 108 may be configured to any thickness, such as a thickness wherein all details of first half of the mold 104 may be fully preserved. For example and without limitation, liner 108 may be a thickness of 0.1 mm. As a further example and without limitation, liner 108 may be a thickness of 0.001 mm. As a further non-limiting example, liner 108 may be a thickness of 0.10 mm. As a further example and without limitation, liner 108 may be a thickness of 0.50 mm.

With continued reference to FIGS. 1A-B, liner 108 may be composed of any material that may be considered a suitable material for use as a liner as described in this disclosure. In an embodiment, liner 108 may include a composition of nickel. For example and without limitation, liner 108 may be composed utilizing a composition of metals, such as copper, aluminum, and the like. As a further non-limiting example, liner 108 may include a hybrid composition of materials, such as chromium and another metal, chrome and diamond, nickel and diamond, nickel, and polytetrafluoroethylene (PTFE), or any combination thereof, and the like. A hybrid composition of materials for liner 108 provide properties such as a higher hardness and lubricity. Persons skilled in the art, upon reviewing the entirety of this disclosure, will be aware of various materials which may be suitable for use as the liner consistently with this disclosure.

Still referring to FIGS. 1A-B, liner 108 may further comprise a release hole. The at least a release hole is configured to allow air to flow through liner 108 to the formed product. The "release hole," as used in this disclosure, is a hole in liner 108 with an opening on the face of liner 108 conformally mated to the bottom face of first half of the mold 104 and the face opposite. The at least a release hole is designed and configured to facilitate the release of the formed product by allowing air to flow in between liner 108 and the formed product. The at least a release hole may include any diameter suitable as a diameter to allow gas of an environment to flow though liner 108 to the formed product. Gas on an environment, as described herein, may include any gas such as oxygen, nitrogen, carbon, or any combination thereof, or any combination of gas that may be found around an injection molding manufacturing system. In an embodiment, for example and without limitation, air may include compressed air, wherein the air is kept under a pressure that is greater than atmospheric pressure. Persons skilled in the art, upon reviewing the entirety of this disclosure, will be aware of various holes which may be suitable for use as the at least a release hole consistently with this disclosure.

Continuing to refer to FIGS. 1A-B, in a non-limiting embodiment, liner 108 may further include one or more alignment holes. An "alignment hole," as used in this disclosure, is a hole, wherein the opening of the holes are located directly opposite the at least a through-hole located in first half of the mold 104. Each alignment hole can be designed and configured to be filled by a respective alignment pin 116. The diameter an alignment hole can be directly correlated to the diameter of a respective alignment pin 116 and the through-hole of first half of the mold 104. For example and without limitation, if the diameter of an alignment pin 116 is 2 mm, the diameter of the respective through-hole will also be 2 mm and the diameter of the respective alignment hole will be 2 mm. As a further non-limiting example, if the diameter of an alignment pin 116 is 0.25", the diameter of the respective through-hole will also be 0.25" and the diameter of the respective alignment hole will be 0.25". Persons skilled in the art, upon reviewing the entirety of this disclosure, will be aware of various holes which may be suitable for use as the at least an alignment hole consistently with this disclosure.

With continued reference to FIGS. 1A-B, system 100 is designed and configured to include collar lock 112. A "collar lock," as used in this disclosure, is a block of material formed to align to the bottom face of first half of the mold 104, wherein the block of material is hollow in the center as to not cover the cavity, core, and/or combination thereof on the bottom face of first half of the mold 104. The hollow center of the block of material is configured to house liner 108, wherein liner 108 and collar lock 112 are secured together utilizing any method of mating as described in the entirety of this disclosure. Collar lock 112 and liner 108 when mated together form an assembly wherein the assembly is moveable. Collar lock 112 may be composed utilizing any material that may be considered a suitable material. For example and without limitation, collar lock 112 may be composed utilizing metals, such as hardened steel, pre-hardened steel, aluminum, beryllium-copper alloy, and/or any combination thereof. Collar lock 112 may be machined utilizing any manufacturing process as described in the entirety of this disclosure.

Continuing to refer to FIGS. 1A-B, the assembly of collar lock 112 and liner 108 are configured to generate a plenum when guided onto the first half of the mold 104. A "plenum," as used in this disclosure, is a hollow space in between the assembly of collar lock 112 and liner 108, wherein the hollow space is used to facilitate the circulation of a gas. The plenum enables the assembly of collar lock 112 and liner 108 to lift as the gas is introduced. For example and without limitation, the assembly of collar lock 112 and liner 108 is free to move when the plenum is filled with compressed air.

Still referring to FIGS. 1A-B, collar lock 112 may include one or more alignment holes. The alignment holes may include any alignment holes as described in the entirety of this disclosure. An alignment hole is designed and configured to be filled by a respective alignment pin 116. The diameter of the alignment hole is directly correlated to the diameter of a respective alignment pin 116 and the through-hole of first half of the mold 104. Persons skilled in the art, upon reviewing the entirety of this disclosure, will be aware of various holes which may be suitable for use as the at least an alignment hole consistently with this disclosure.

Continuing to refer to FIGS. 1A-B, system 100 is further designed and configured to include one or more alignment pins 116. An "alignment pin," as used in this disclosure, is a pin inserted through the at least an alignment hole in collar lock 112 and the at least a through-hole in first half of the mold 104. In a non-limiting embodiment, an alignment pin 116 may be inserted through a respective alignment hole in liner 108. The diameter an alignment pin 116 may include any diameter suitable to ensure liner 108 remains secured to first half of mold 104 throughout the duration of the present system and method. The length of an alignment pin 116 may include any length suitable to ensure liner 108 remains secured to first half of mold 104 throughout the duration of the present system and method. In an embodiment, as a non-limiting example, the length of an alignment pin 116 may be equal to or greater than the combined thickness of first half of the mold 104, liner 108 and collar lock 112. An alignment pin 116 may be composed of any material suitable for use as alignment pin 116. For example and without limitation, an alignment pin 116 may be composed utilizing metals, such as hardened steel, pre-hardened steel, aluminum, beryllium-copper alloy, and/or any combination thereof. Persons skilled in the art, upon reviewing the entirety of this disclosure, will be aware of various materials which may be suitable for use as the at least an alignment pin consistently with this disclosure.

With continued reference to FIGS. 1A-B, an alignment pin 116 can be designed and configured to guide collar lock 112 and liner 108 to first half of the mold 104. An alignment pin 116 may be inserted into a respective alignment hole of collar lock 112 and the through-hole in first half of the mold 104 using any suitable means of insertion, such as by an automated process or a manual process. Persons skilled in the art, upon reviewing the entirety of this disclosure, will be aware of various methods of inserting the at least an alignment pin which may be suitable for use as the means of aligning the assembly of the collar lock and the liner to the first half of the mold consistently with this disclosure.

Still referring to FIGS. 1A-B, system 100 is further designed and configured to include second half of the mold 120. A "second half of the mold," as used in this disclosure, is the half of the mold of the product attached to the fixed side of the press of the injection molding manufacturing system. The configuration of second half of the mold 120 is merely exemplary and should in no way be considered limiting. Second half of the mold 120 may include a cavity, core, and/or any combination thereof on a top face, wherein the top face is the face of second half of the mold 120 which is opposite and opposed to the face attached to the fixed side of the press of the injection molding manufacturing system. The cavity may include any cavity as described in the entirety of this disclosure. The core may include any core as described in the entirety of this disclosure. Second half of the mold 120 may be composed utilizing any material that may be considered a suitable material. For example and without limitation, second half of the mold 120 may be composed utilizing metals, such as hardened steel, pre-hardened steel, aluminum, beryllium-copper alloy, and/or any combination thereof. Second half of the mold 120 may be manufactured utilizing any machining process, such as subtractive manufacturing. Persons skilled in the art, upon reviewing the entirety of this disclosure, will be aware of various materials which may be suitable for use as the second half of the mold consistently with this disclosure.

With continued reference to FIGS. 1A-B, system 100 is configured to generate a total mold. The "total mold," as used in this disclosure, is mold created by clamping first half of the mold 104 and second half of the mold 120 utilizing the press of the injection molding manufacturing system. The cavity, the core, and/or combination thereof on the bottom face of first half of the mold 104 is configured to align with the cavity, the core, and/or combination thereof on the top face of second half of the mold 120. When first half of the mold 104 is clamped to second half of the mold 120, the core of first half of the mold 104 is configured to align with the cavity in second half of the mold 120. Additionally, when first half of the mold 104 is clamped to second half of the mold 120, the cavity in first half of the mold 104 is configured to align with the core of second half of the mold 120. Persons skilled in the art, upon reviewing the entirety of this disclosure, will be aware of various molds which may be suitable for use as the total mold consistently with this disclosure.

Continuing to refer to FIGS. 1A-B, the total mold is configured to include an opening. The "opening," as used in this disclosure, is the void space created in between first half of the mold 104 and second half of the mold 120 when clamped together utilizing the press of the injection molding manufacturing system. The opening of the total mold is configured to reflect the dimensions of the product. The dimensions of the product may be configured to include an allowance. An allowance, as used in this disclosure, is a dimensional modification to the mold to account for manufacturing process occurrences, such as shrinkage, draft, machining, and distortion. The opening is further configured to be filled with a molten material, wherein the molten material will generate a formed product. A "molten material," as used in this disclosure, is any polymer which may be used as a resin suitable for use in an injection molding manufacturing process. For example and without limitation, the molten material may include any thermoplastic, such as Acrylonitrile Butadiene Styrene (ABS), Polyethylene, Polycarbonate (PC), Polyamide (Nylon), High Impact Polystyrene (HIPS), Polypropylene, Polyoxymethylene (POM), Polymethyl Methacrylate (PMMA), Polypropylene (PP), Polybutylene Terephthalate (PBT), Polyphenylsulfone (PPSU), Polyether Ether Ketone (PEEK), Polyetherimide (PEI), any combination thereof, and the like. As a further example and without limitation, the molten material may include any thermoset, such as polyester, phenolic, vinyl ester, polyurethane, silicone, polyamide, any combination thereof, and the like. As a further non-limiting example, the molten material may include any elastomer, such as unsaturated polymers, saturated polymers, thermoplastic elastomers (TPE), any combination thereof, and the like. The molten material may include any combination of materials suitable for use in an injection molding manufacturing process. The molten material may include an additive, wherein the additive improves the properties of the molten material. The additive may include, for example and without limitation, glass, and carbon fiber. The opening may further include channels, wherein the channels allow a molten material to run along them and fill the full volume of the opening of the total mold with the molten material. Persons skilled in the art, upon reviewing the entirety of this disclosure, will be aware of various materials which may be suitable for use as the molten material consistently with this disclosure.

Continuing to refer to FIGS. 1A-B, second half of the mold 120, of system 100, is configured to include remover ring 124. A "remover ring," as used in this disclosure, is a ring with one end exposed on the top face of second half of the mold 120 and the other end is inside the sprue bushing of second half of the mold 120. Remover ring 124 is configured to pull the sprue from the sprue bushing of second half of the mold 120. The sprue, as used in this disclosure, is a piece of molten material that has cooled inside the sprue bushing of second half of the mold 120. Remover ring 124 may be composed of any material as described in the entirety of this disclosure. Remover ring 124 may be actuated by any method suitable to cause remover ring 124 to pull the sprue from the sprue bushing of second half of the mold 120. For example and without limitation, remover ring 124 may be actuated by a spring, wherein the spring initiates remover ring 124 to pull the sprue from the sprue bushing of second half of the mold 120. As a further example and without limitation, remover ring 124 may be actuated by a pneumatic system, wherein the pneumatic system initiates remover ring 124 to pull the sprue from the sprue bushing of second half of the mold 120. Persons skilled in the art, upon reviewing the entirety of this disclosure, will be aware of various rings which may be suitable for use as the remover ring consistently with this disclosure.

Still referring to FIGS. 1A-B, system 100 is configured to include sprue bushing 128. A "sprue bushing," as used in this disclosure, is a component that connects with the nozzle to transfer the molten material from the nozzle to the opening of the total mold. Sprue bushing 128 is further configured to include a hollow opening, wherein the hollow opening is a hole throughout the shaft of sprue bushing 128 with an opening on each end of sprue bushing 128. Sprue bushing 128 is configured to insert into second side of the mold 120, wherein the hollow opening in sprue bushing 128 creates a hole through second side of the mold 120. The end of sprue bushing 128 may be substantially flush with the top face of second side of the mold 120. For example and without limitation, flush with the top face of second side of the mold 120 is further configured to include remover ring 124 inserted inside sprue bushing 128. The face opposite the top face of second side of the mold 120 may include a guide ring, wherein sprue bushing 128 can be configured to pass through the guide ring and into a hole of second side of the mold 120. The radius of the hollow opening of sprue bushing 128 can be equivalent to the radius of the nozzle of the injection molding manufacturing system to ensure a proper seal is formed. Sprue bushing 128 may include, for example and without limitation, a hot sprue bushing, wherein the component includes a heating element. As a further example and without limitation, sprue bushing 128 may include a cold sprue bushing, wherein the sprue bushing is unheated. Sprue bushing 128 may be composed of any suitable material, as described in the entirety of this disclosure. For example and without limitation, sprue bushing 128 may be composed of any metal, such as hardened steel, a copper base alloy, any combination thereof, and the like. Sprue bushing 128 may include an inner coating. For example and without limitation, the inner coating of sprue bushing 128 may include carbide, wherein carbide provides the sprue bushing with wear and corrosion resistance and increases the heat transfer rate. Persons skilled in the art, upon reviewing the entirety of this disclosure, will be aware of various sprue bushings which may be suitable for use as the sprue bushing consistently with this disclosure.

With continued reference to FIGS. 1A-B, system 100 is further configured to include guide ring 132. A "guide ring," as used in this disclosure, is a circular component used to properly align the total mold in the correct position in the injection molding manufacturing system. Proper alignment between the nozzle and sprue bushing 128 helps to eliminate leakage of the molten material. Guide ring 132 is configured to fit to the face opposite the top face of second half of the mold 120. In embodiments, guide ring 132 can be secured by sprue bushing 128 being inserted through the opening in guide ring 132. Guide ring 132 may be composed of any suitable material, as described in the entirety of this disclosure. For example and without limitation, guide ring 132 may be composed of any metal, such as hardened steel, a case-hardened medium carbon steel material (CHMCS), any combination thereof, and the like. Persons skilled in the art, upon reviewing the entirety of this disclosure, will be aware of various rings which may be suitable for use as the guide ring consistently with this disclosure.

Figure 2A:
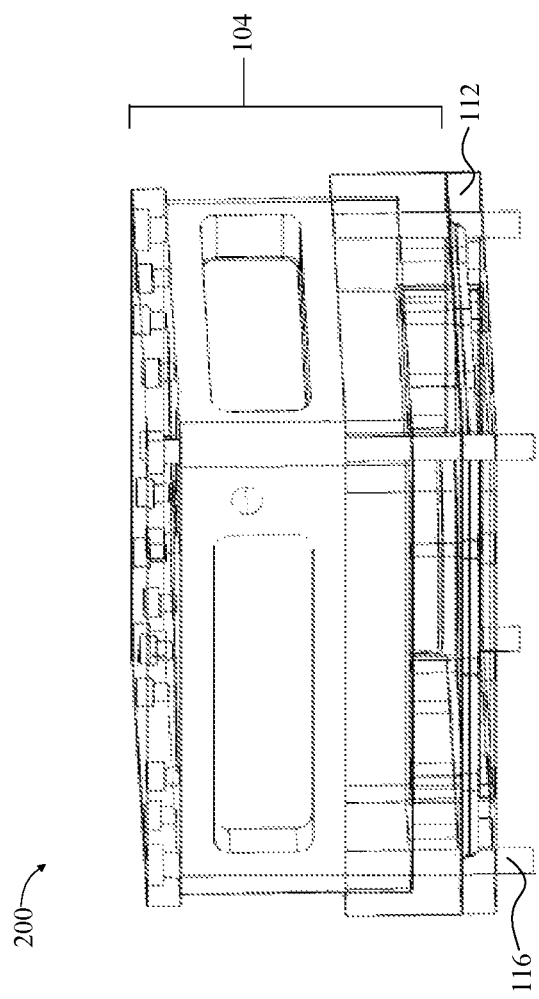
FIGS. 2A-B illustrate perspective views of an exemplary embodiment of a completed first half of the mold of a product.
Figure 2B:
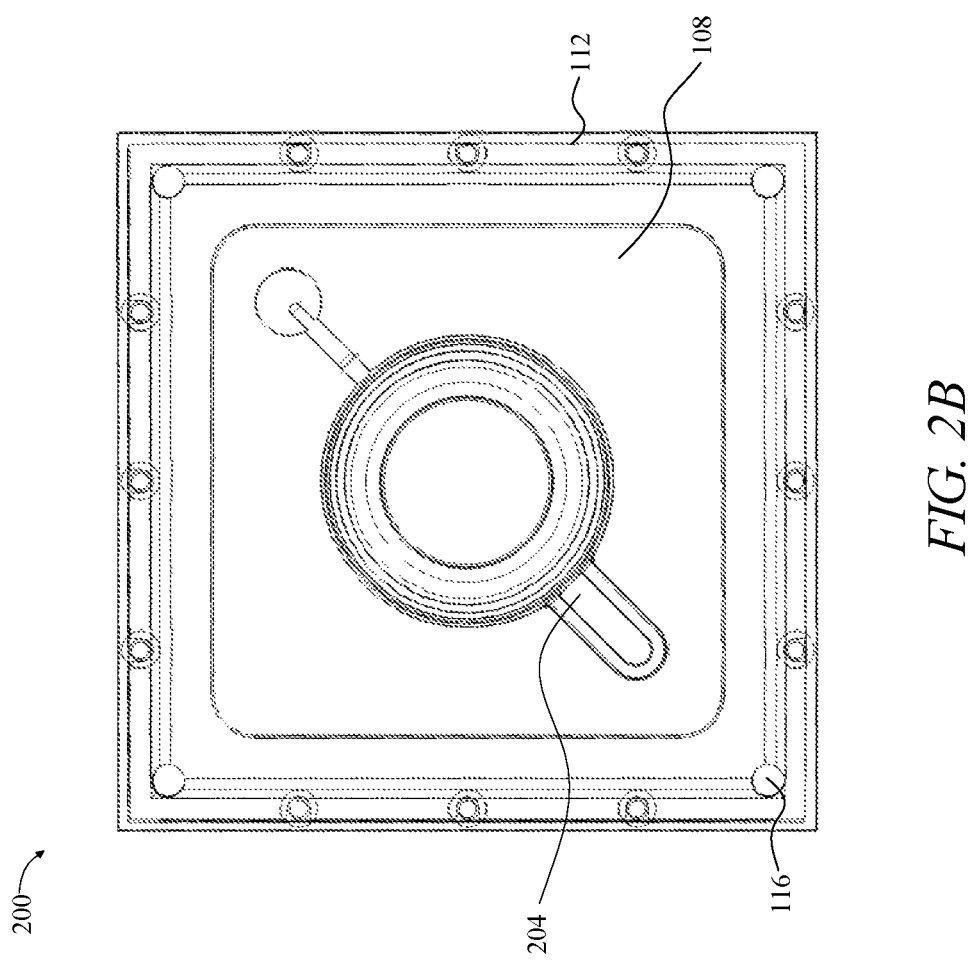

Referring now to FIGS. 2A-B, injection molding manufacturing system is further designed and configured to include completed first half of the mold 200. A "completed first half of the mold," as used in this disclosure, is the half of the mold of the product attached to the moving clamp side of the press of the injection molding manufacturing system after the molten material has cooled inside the opening in the total mold. The configuration of completed first half of the mold 200 is merely exemplary and should in no way be considered limiting. Completed first half of the mold 200 may be clamped to second half of the mold 120 and may be released from second half of the mold 120 by utilizing the press of the injection molding manufacturing system. In an embodiment, completed first half of the mold 200 can comprise the combination of first half of the mold 104, liner 108, collar lock 112, alignment pin 116, and a formed product.

With continued reference to FIGS. 2A-B, completed first half of the mold 200 is further configured to include formed product 204. A "formed product," as used in this disclosure, is the molten material having been cooled and retaining the dimensions of the hole. Cooling the molten material may be performed utilizing any suitable cooling method. For example and without limitation, cooling may include air cooling systems, fluid systems, any combination thereof, and the like. As a further example and without limitation, cooling may include utilizing conduction of heat away from the molten material, into the first half of the mold, and out of the first half of the mold into the air through convection. In a further embodiment and without limitation, cooling the molten material may be performed utilizing at least a cooling line. A "cooling line" as described herein, is a cooling passageway in the first half of the mold 104 and second half of the mold 120, wherein the cooling passageway closely follows the shape of the mold core and/or cavity. In an embodiment, the at least a cooling line may be utilized as a heating passageway in the first half of the mold 104 and the second half of the mold 120. As completed first half of the mold 200 is released from second half of the mold 120, formed product 204 is designed to remain inside liner 108. In embodiments, liner 108 and formed product 204 are configured to be ejected from completed first half of the mold 200. Ejection may include any suitable means for ejection, wherein ejection may be an automated process, a manual process, and/or any combination thereof. Ejecting collar lock 112, liner 108 and formed product 204 can further be configured to inject a gas into the plenum, wherein injecting the gas causes collar lock 112 and liner 108 to rise out of the completed first half of the mold 200. The gas may include any suitable gas for means of facilitation ejection of liner 108 and finished product 204. For example and without limitation, the gas may include compressed air. The gas is configured, in an embodiment, to fill the plenum, wherein filling the plenum with gas is configured to raise the assembly of collar lock 112 and liner 108, wherein the assembly may include formed product 204. In an embodiment, and without limitation, the alignment pins are configured to guide the motion of the assembly of collar lock 112 and liner 108 lifting away from first half of the mold 104. As the assembly of collar lock 112 and liner 108, including formed product 204, reach the limit of lift, an additional pressure is introduced causing liner 108 to bow outward.

With continued reference to FIG. 2, injecting a gas into completed first half of the mold 200 is configured to further include injecting the gas through liner 108 by utilizing a release hole of liner 108. Formed product 204 is further configured to be released from liner 108. Release of formed product 204 may include any suitable method of releasing formed product 204 from liner 108. For example and without limitation, release of formed product 204 from liner 108 may include flexing liner 108 outward to facilitate release of formed product 204. As a further example and without limitation, release of formed product 204 may include air passing through liner 108 by means of the release hole. The air can facilitate a release of formed product 204. Release of formed product 204 is further configured to include, for example and without limitation, repositioning of the assembly of collar lock 112 and liner 108 on the first half of the mold 104, wherein the assembly moves down the at least an alignment pin and is guided back into alignment with first half of the mold 104. Persons skilled in the art, upon reviewing the entirety of this disclosure, will be aware of various products which may be suitable for use as the formed product consistently with this disclosure.

Figure 3A:
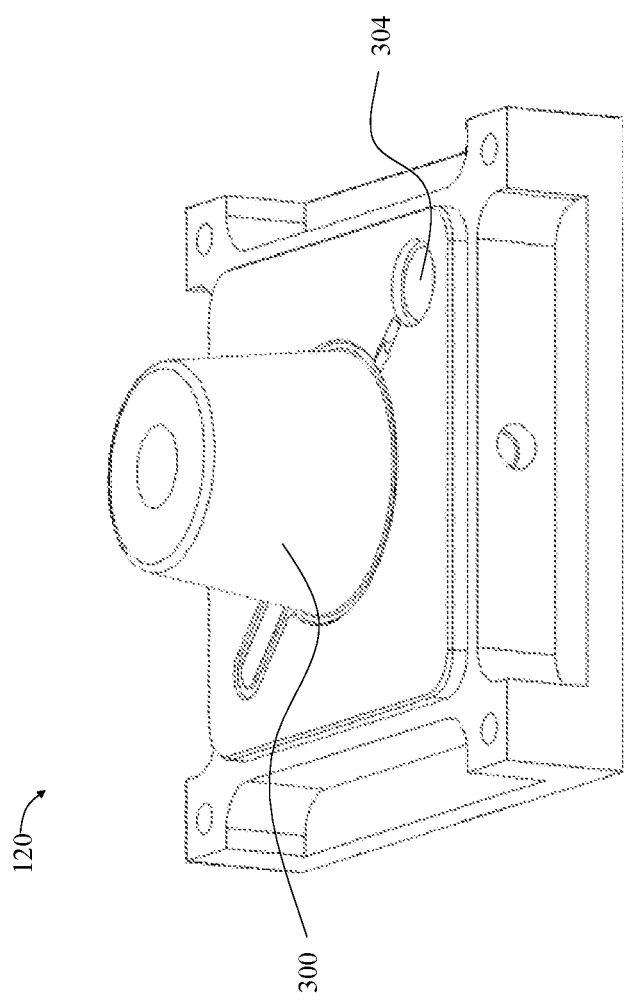
FIGS. 3A-B illustrate perspective views of an exemplary embodiment of a second half of the mold of a product.
Figure 3B:
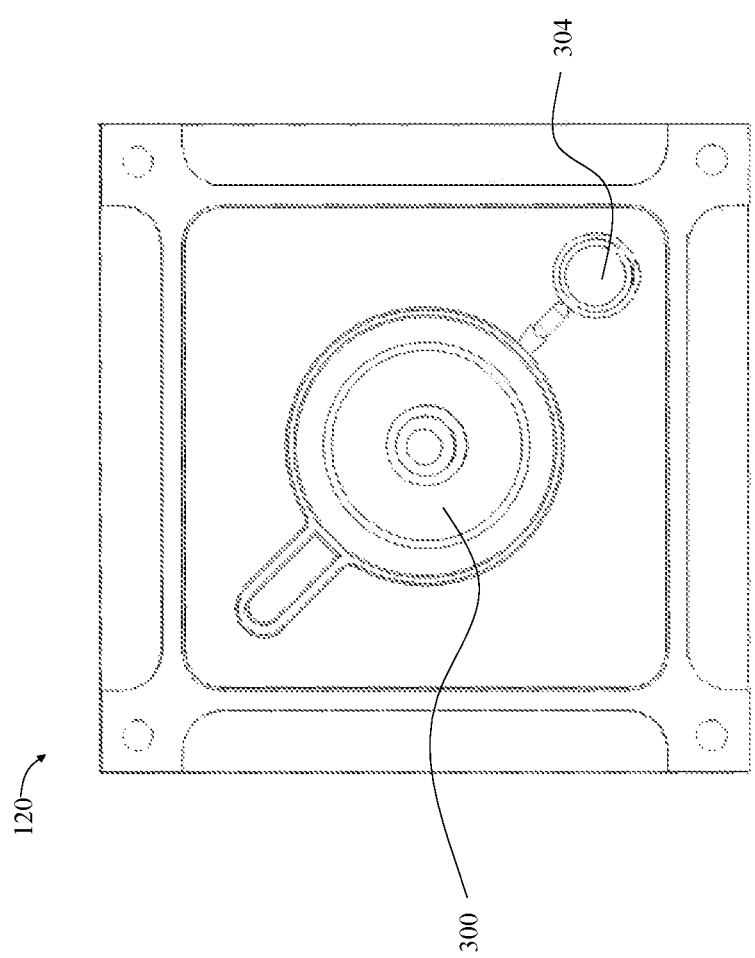

Referring now to FIGS. 3A-B, an exemplary embodiment of second half of the mold 120 is illustrated. The configuration of second side of the mold 120 is merely provided as an example and should in no way be considered limiting. Second half of the mold 120 may include any second half of the mold 120 as described above in reference to FIGS. 1A-B. Second half of the mold 120 may be composed utilizing any material as described in the entirety of this disclosure. In this example, second half of the mold 120 is configured to include core 300. Core 300 may include any core as described above in reference to FIGS. 1A-B. Core 300 is configured to align with a cavity of first half of the mold 104 when second half of the mold 120 and first half of the mold 104 are clamped together. The alignment of core 300 with the cavity of first half of the mold 104 can produce an opening of the total mold. In this example, second half of the mold 120 is further configured to include hole 304. The second half of the mold 120 is configured to be disposed with hole 304, wherein there is an opening on the top face of second half of the mold 120 and the face of second half of the mold 120 opposite the bottom face. In an embodiment, hole 304 is configured to include cooled molten material, wherein hole 304 is filled with hardened material. Remover ring 124 is configured to spring outward as the first half of the mold 104 separated from the second half of the mold 120, wherein springing forward breaking the sprue, or cooled molten material in hole 304, away from formed product 204, as described in further detail above in reference to FIGS. 1A-B.

Figure 4:
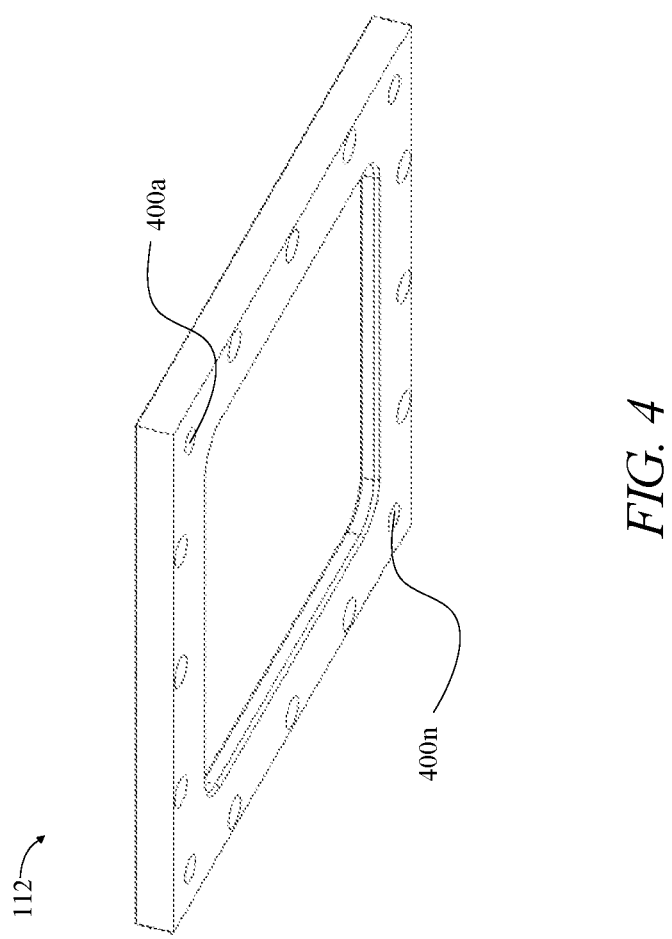
FIG. 4 is a perspective view of an exemplary embodiment of a collar lock.

Referring now to FIG. 4, an exemplary embodiment of collar lock 112 is illustrated. The configuration of collar lock 112 is merely exemplary and should in no way be considered limiting. Collar lock 112 may include any collar lock 112 as described above in further detail in reference to FIGS. 1A-2B. Collar lock 112 may be composed utilizing any suitable material as described in the entirety of this disclosure. As described above in further detail, the assembly of collar lock 112 and liner 108 is configured to guide to first half of the mold 104 when used in combination with the at least an alignment pin. In this example, collar lock 112 is configured to include alignment holes 400a-n. Alignment holes 400 may each include any alignment hole as described above in further detail in reference to FIGS. 1A-B. The number of at least an alignment hole 400a-n is merely an embodiment and is in no way limiting, any number of at least an alignment hole 400a-n may be used in collar lock 112. Alignment holes 400a-n is configured to be filled by at least an alignment pin, wherein the filling fastens the assembly of collar lock 112 and liner 108 in the correct position, as described above in further detail in reference to FIGS. 1A-B.

Figure 5:
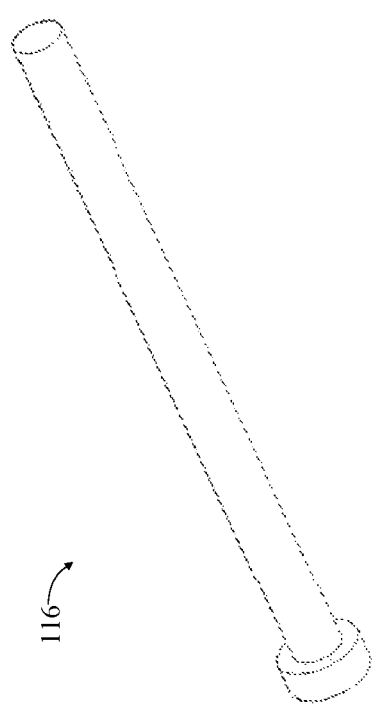
FIG. 5 is a perspective view of an exemplary embodiment of at least an alignment pin.

Referring now to FIG. 5, an exemplary embodiment of an alignment pin 116 is illustrated. The configuration an alignment pin 116 is merely exemplary and should in no way be considered limiting. Alignment pin 116 may include any alignment pin as described above in further detail in reference to FIGS. 1A-B. Alignment pin 116 may be composed utilizing any suitable material as described in the entirety of this disclosure. As described above in further detail, an alignment pin 116 is configured to align the assembly of collar lock 112 and liner 108 to first half of the mold 104, wherein alignment may further include fastening the assembly of collar lock 112 and liner 108 to first half of the mold 104. Fastening may include any fastening as described in the entirety of this disclosure. For example and without limitation, fastening collar lock 112 and liner 108 to first half of the mold 104 may include inserting alignment pin 116 into at least an alignment hole, as described above in further detail in reference to FIGS. 1A-2B.

Figure 6A:
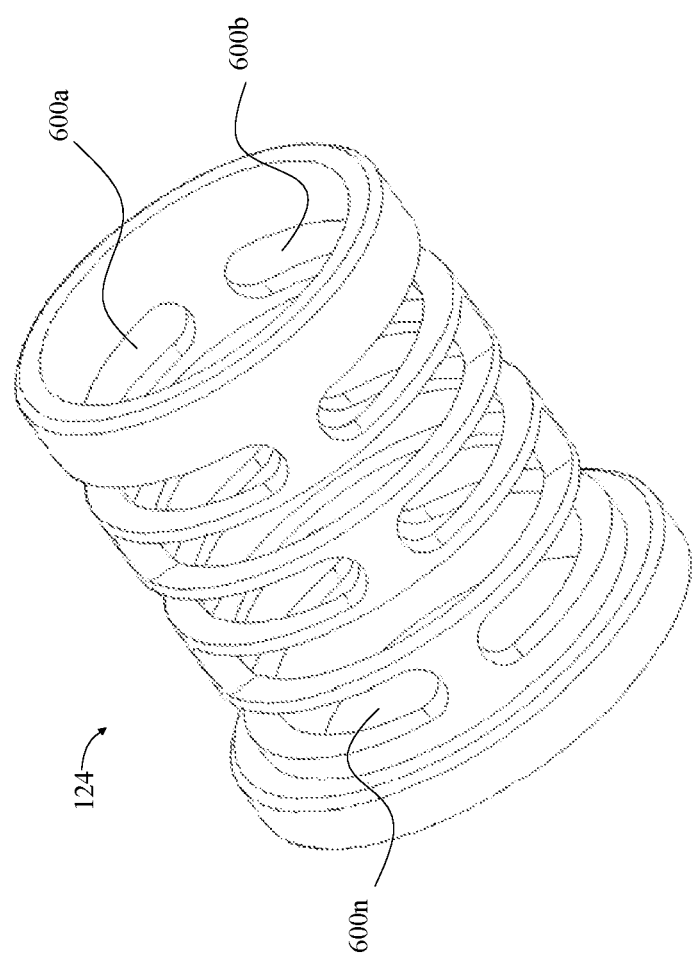
FIGS. 6A-B illustrate perspective views of an exemplary embodiment of a remover ring.
Figure 6B:
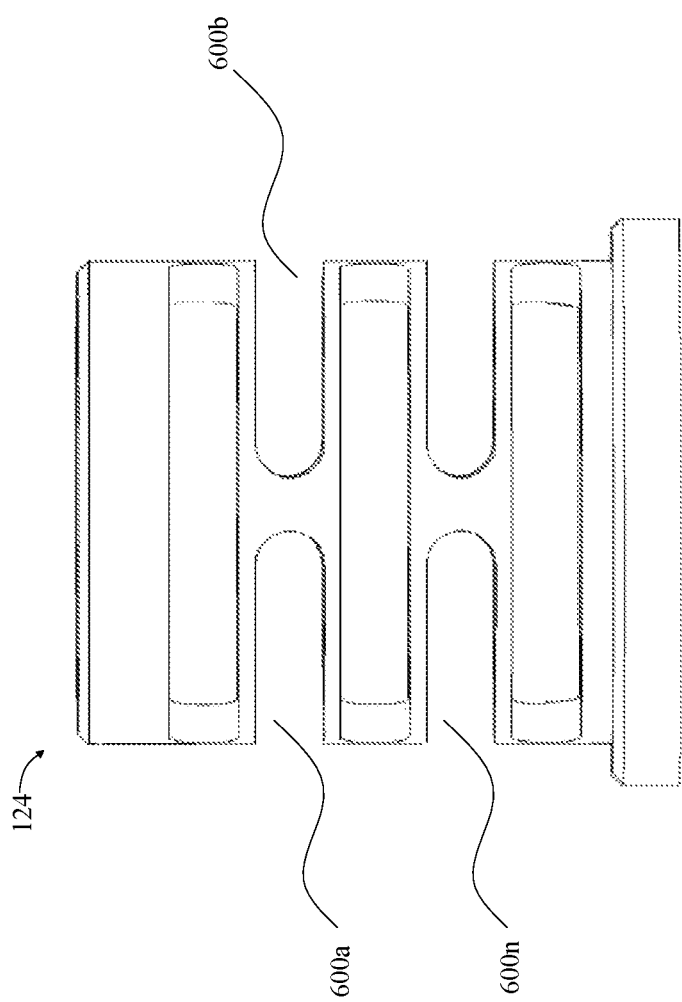

Referring now to FIGS. 6A-B, an exemplary embodiment of remover ring 124 is illustrated. The configuration of remover ring 124 is merely exemplary and should in no way be considered limiting. Remover ring 124 may include any remover ring 124 as described above in reference to FIGS. 1A-B and FIG. 3. Remover ring 124 may be composed utilizing any suitable material as described in the entirety of this disclosure. Remover ring 124, as described in further detail above, is configured to pull the sprue from sprue bushing 128 of second half of the mold 120. The sprue may include any sprue as describe in the entirety of this disclosure. Sprue bushing 128 may include any sprue bushing 128 as described in further detail in the entirety of this disclosure. Remover ring 128 is actuated utilizing any method of actuation as described above in further detail in reference to FIGS. 1A-B, such as by a spring, a pneumatic system, any combination thereof, and the like. In embodiments, remover ring 124 is configured to include slits 600a-n. The number of slits 600a-n is merely an embodiment and is in no way limiting, any number of slits 600a-n may be used in remover ring 124. Slits 600a-n are each configured to assist in separating the sprue from sprue brushing 128 when remover ring 124 is actuated, wherein the slits are configured to enable remover ring 124 to compress and release as a spring. The configuration of slits 600a-n is merely exemplary and should in no way be considered limiting. Remover ring 124 is configured to be inserted into the opening sprue bushing 128 located on the top face of second half of the mold 120, as described above in further detail in reference to FIGS. 1A-B and FIG. 3. Remover ring 124 is configured to have molten material pass through the remover ring 124 as the molten material flows through sprue bushing 128 and into the opening of the total mold, as described above in further detail in reference to FIGS. 1A-B.

Figure 7:
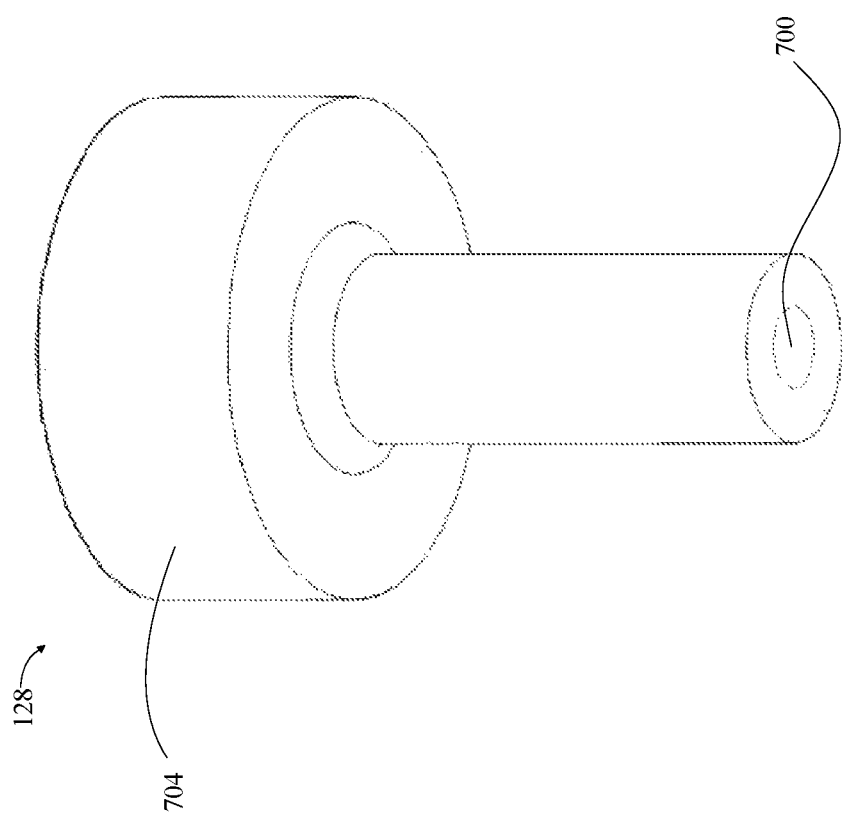
FIG. 7 is a perspective view of an exemplary embodiment of a sprue bushing.

Referring now to FIG. 7, an exemplary embodiment of sprue bushing 128 is illustrated. Sprue bushing 128 may include any sprue bushing as described above in further detail in reference to FIGS. 1A-B. Sprue bushing 128 may be composed utilizing any suitable material as described in the entirety of this disclosure. Sprue bushing 128, as described above in further detail in reference to FIGS. 1A-B, is configured to insert into second side of the mold 120. Sprue bushing 128 is further configured to include hollow opening 700, wherein hollow opening 700 of sprue bushing 128 creates a hole through second side of the mold 120. The end of hollow opening 700 flush with the top face of second side of the mold 120 includes remover ring 124 inserted inside hollow opening 700 of sprue bushing 128, as described above in further detail in reference to FIGS. 1A-B. The radius of hollow opening 700 of sprue bushing 128 can be equivalent to the radius of the nozzle of the injection molding manufacturing system to ensure a proper seal is formed, as described above in further detail in reference to FIGS. 1A-B. In this example and without limitation, sprue bushing 128 is further configured to include check ring 704. Check ring 704, as used in this disclosure, is a component used to prevent the molten material from escaping sprue bushing 128 as the opening in the total mold is filled. Check ring 704 may be composed utilizing any suitable material utilized in composing sprue bushing 128, as described in further detail in the entirety of this disclosure.

Figure 8:
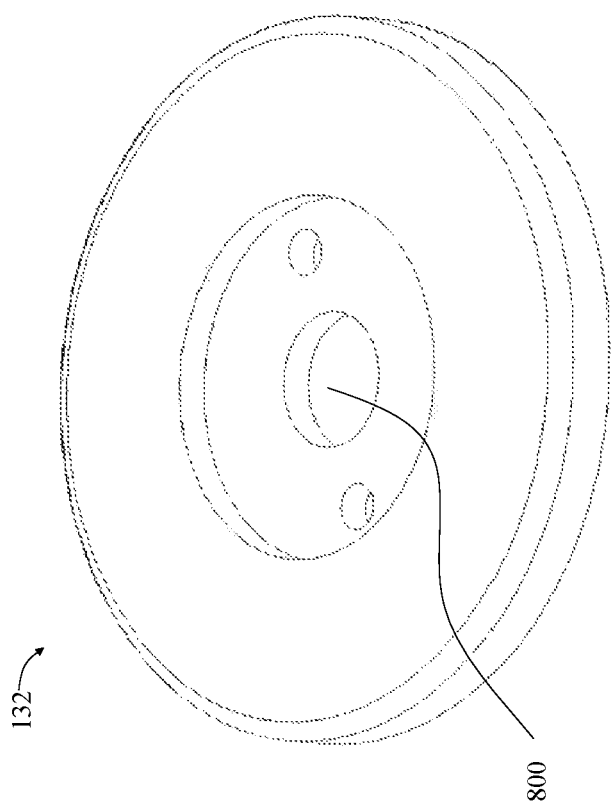
FIG. 8 is a perspective view of an exemplary embodiment of a guide ring.

Referring now to FIG. 8, an exemplary embodiment of guide ring 130 is illustrated. The configuration of guide ring 130 is merely exemplary and should in no way be considered limiting. Guide ring 132 may include any guide ring 132 as described in further detail above in reference to FIGS. 1A-B and FIG. 3. Guide ring 132 may be composed utilizing any suitable material, as described in further detail in the entirety of this disclosure. Guide ring 128, as described above in further detail, is configured to fit to the face of second half of the mold 120 opposite the top face. Guide ring 132 can be used to position the total mold in the correct position in the injection molding manufacturing system. In this example, guide ring 132 is configured to include ring opening 800. Ring opening 800, as used in this disclosure, is designed and configured to secure guide ring 132 to second half of the mold 120 by sprue bushing 128 being inserted through the ring opening 800 of guide ring 132, as described above in further detail in reference to FIGS. 1A-B. The radius of ring opening 800 is configured to be equal to the radius of sprue bushing 128, as described above in further detail in reference to FIGS. 1A-B.

Figure 9:
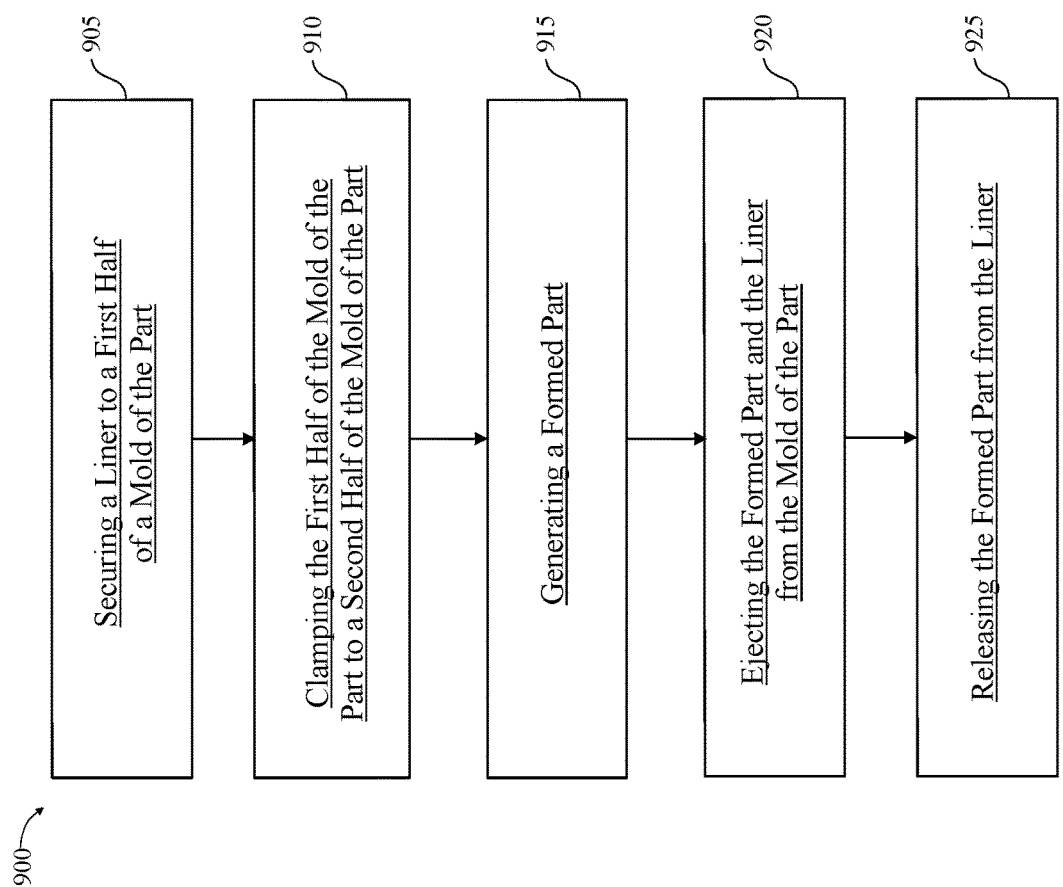
FIG. 9 is a flow diagram illustrating a method of producing a product utilizing a liner.

Referring now to FIG. 9, an exemplary method 900 of producing a product utilizing liner 108 is illustrated. In step 905, collar lock 112 and liner 108 is guided to first half of the mold 104 of the product at an injection molding manufacturing system. Step 905 may be performed in any suitable manner, as described in the entirety of this disclosure. First half of the mold 104 may include any first half of the mold 104 as described in further detail above in reference to FIGS. 1A-2B. First half of the mold 104 may include a cavity, a core, and/or any combination thereof on a bottom face, wherein the bottom face is the face of first half of the mold 104 which is opposite the face attached to the moving side of the press of the injection molding manufacturing system, as described above in further detail in reference to FIGS. 1A-B. First half of the mold 104 may be composed utilizing any material that may be considered a suitable material, as described in the entirety of this disclosure. First half of the mold 104 may be manufactured utilizing any machining process, such as subtractive manufacturing, additive manufacturing, and the like. As described above in further detail in reference to FIGS. 1A-B, first half of the mold 104 may include a through-hole. The through-hole is configured to be filled by a respective alignment pin 116, wherein the diameter of the through-hole is directly correlated to the diameter of alignment pin 116, as described above in further detail in reference to FIGS. 1A-2B.

Continuing to refer to FIG. 9, liner 108 may include any liner 108 as described in further detail above in reference to FIGS. 1A-2B. Liner 108 is configured to ease in the facilitation of removing a formed product from a completed first half of the mold while minimizing the imperfections in the surface of the formed product, as described above in further detail. Liner 108 is configured to conform to the shape of the bottom face of first half of the mold 104, wherein every detail of the surface of the bottom face of first half of the mold 104, as described in further detail above in reference to FIGS. 1A-2B. In an embodiment, liner 108 preserves the angles between each directed curve of the plurality of directed curves and preserves the orientation. Liner 108 may be configured to any thickness, wherein the thickness fully preserves all details of first half of the mold 104, as described above in further detail in reference to FIGS. 1A-B. Liner 108 may be composed of any material that may be considered a suitable material, as described in the entirety of this disclosure. In an embodiment, liner 108 may include a composition of nickel. Liner 108 composed of nickel may include, for example and without limitation trace amounts of sulfur, wherein the amount is in the hundredths of a percent range. Liner 108 may further be secured to collar lock 112 forming an assembly of collar lock 112 and liner 108, wherein the assembly of collar lock 112 and liner 108 includes an alignment hole 116, as described above in reference to FIGS. 1A-2B. As described above in further detail, the alignment hole is configured to be filled by a respective alignment pin 116. The diameter of the alignment hole is directly correlated to the diameter of a respective alignment pin 116 and a through-hole of first half of the mold 104. As described above in further detail in reference to FIGS. 1A-2B, liner 108 may further comprise a release hole. For example and without limitation, the release hole may include scores of release holes across the liner to facilitate the passage of air. The release hole is configured to allow air to flow through liner 108 to formed product 204 however prevent the passage of molten plastic, wherein formed product 204 is the result of the cooled molten material, as described in further detail in the entirety of this disclosure. The release hole is designed and configured to facilitate the release of the formed product by allowing air to flow in between liner 108 and the formed product, as described above in further detail in reference to FIGS. 1A-2B. The release hole may include any diameter suitable as a diameter to allow air to flow though liner 108 to formed product 204 and prevent the passage of molten plastic through liner 108 and to formed product 204, as described in further detail above in reference to FIGS. 1A-2B.

With continued reference to FIG. 9, in an embodiment, guiding a liner and a collar lock onto a first half of a mold may include fastening the assembly of collar lock 112 and liner 108 to first half of the mold 104 utilizing an alignment pin 116, wherein the alignment pin 116 is inserted through collar lock 112 and into first half of the mold 104. Collar lock 112 may include any collar lock 112 as described in the entirety of this disclosure. Collar lock 112 may be configured to be a component, wherein the component is hollow in the center as to not cover the cavity, core, and/or combination thereof on the bottom face of first half of the mold 104. The hollow center of the block of material is configured to house liner 108, wherein liner 108 and collar lock 112 are secured together utilizing any method of mating as described in the entirety of this disclosure. Collar lock 112 and liner 108 when mated together form an assembly wherein the assembly is moveable. Collar lock 112 may be composed utilizing any material that may be considered a suitable material. For example and without limitation, collar lock 112 may be composed utilizing metals, such as hardened steel, pre-hardened steel, aluminum, beryllium-copper alloy, and/or any combination thereof. Collar lock 112 may be composed utilizing any material that may be considered a suitable material, as described above in further detail. Collar lock 112 may be machined utilizing any manufacturing process as described in the entirety of this disclosure. The assembly of collar lock 112 and liner 108 are configured to generate a plenum when guided onto the first half of the mold 104. The plenum is a hollow space in between the assembly of collar lock 112 and liner 108, wherein the hollow space is used to facilitate the circulation of a gas, as described in the entirety of this disclosure. The plenum enables the assembly of collar lock 112 and liner 108 to lift as the gas is introduced. For example and without limitation, the assembly of collar lock 112 and liner 108 is free to move when the plenum is filled with compressed air.

Continuing to refer to FIG. 9, an alignment pin 116 may include any alignment pin 116 as described in the entirety of this disclosure. An alignment pin 116 may be composed of any material suitable for use as alignment pin 116. As described in further detail in reference to FIGS. 1A-2B and FIGS. 4-5, the diameter of an alignment pin 116 may include any diameter suitable to ensure liner 108 remains aligned to first half of mold 104 throughout the duration of the present system and method. The length of an alignment pin 116 may include any length suitable to ensure liner 108 remains aligned to first half of mold 104 throughout the duration of the present system and method, as described in further detail in reference to FIGS. 1A-2B and FIGS. 4-5. For example and without limitation, the length of an alignment pin 116 may be equal to the combined thickness of first half of the mold 104, liner 108, and collar lock 112. An alignment pin 116 can be designed and configured to align the assembly of collar lock 112 and liner 108 to first half of the mold 104, wherein fastening will secure liner 108 to first half of the mold 104. An alignment pin 116 may be inserted into a respective alignment hole in collar lock 112 and the through-hole in first half of the mold 104 using any suitable means of insertion, such as by an automated process or a manual process. For example and without limitation, an alignment pin 116 may be inserted through a respective alignment hole in collar lock 112, the respective alignment hole in liner 108, and the through-hole in first half of the mold 104, as described in further detail above in reference to FIGS. 1A-2B and FIGS. 4-5.

Still referring to FIG. 9, at step 910, first half of the mold 104 can be clamped to second half of the mold 120, wherein clamping first half of the mold 104 to second half of the mold 120 generates a total mold. Second half of the mold 120 may include any second half of the mold 120 as described in the entirety of this disclosure. As described in further detail above in reference to FIGS. 1A-3, second half of the mold 120 may include a cavity, a core, and/or any combination thereof on a top face, wherein the top face is the face of second half of the mold 120 which is opposite and opposing to the face attached to the fixed side of the press of the injection molding manufacturing system. The cavity may include any cavity as described throughout the entirety of this disclosure. The core may include any core as described in the entirety of this disclosure. Second half of the mold 120 may be composed utilizing any material that may be considered a suitable material, as described in the entirety of this disclosure. The cavity, the core, and/or combination thereof on the bottom face of first half of the mold 104 is configured to align with the cavity, the core, and/or combination thereof on the top face of second half of the mold 120, as described above it further detail above in reference to FIGS. 1A-3. When first half of the mold 104 is clamped to second half of the mold 120, the core in first half of the mold 104 is configured to align with the cavity in second half of the mold 120. Additionally, when first half of the mold 104 is clamped to second half of the mold 120, the cavity in first half of the mold 104 is configured to align with the core in second half of the mold 120. Clamping may include any process of clamping first half of the mold 104 to second half of the mold 120 as described in the entirety of this disclosure. For example and without limitation, clamping may include a manual process of clamping first half of the mold 104 to second half of the mold 120. As a further non-limiting example, clamping may include an automated process of clamping first half of the mold 104 to second half of the mold 120.

Continuing to refer to FIG. 9, as described above in further detail in reference to FIGS. 1A-B and FIG. 3, clamping first half of the mold 104 to second half of the mold 120 generates a total mold, wherein the total mold is configured to include an opening. The opening of the total mold may include any opening as described above in further detail in reference to FIGS. 1A-3. As described in further detail throughout the entirety of this disclosure, the opening of the total mold is configured to reflect the dimensions of the product. The dimensions of the product may be configured to include an allowance. The allowance may include any allowance as described throughout the entirety of this disclosure. The opening is further configured to be filled with a molten material, as described above in further detail in reference to FIGS. 1A-3. The opening may further include channels, wherein the channels allow a molten material to run along them and fill the full volume of the opening of the total mold with the molten material. The channels may include any channel as described above in further detail in reference to FIGS. 1A-B and FIG. 3.

With continued reference to FIG. 9, second half of the mold 120 is configured to include remover ring 124. Remover ring 124 may include any remover ring, as described in the entirety of this disclosure. As described above in further detail in reference to FIGS. 1A-B and FIGS. 6A-B, remover ring 124 is configured to pull the sprue from the sprue bushing of second half of the mold 120. The sprue may include any sprue as described in the entirety of this disclosure. Remover ring 124 may be composed of any material as described in the entirety of this disclosure. Remover ring 124 may be actuated by any method suitable to cause remover ring 124 to pull the sprue from the sprue bushing of second half of the mold 120, as described above in reference to FIGS. 1A-B and FIGS. 6A-B. For example and without limitation, remover ring 124 may be actuated by a spring, wherein the spring initiates remover ring 124 to pull the sprue from the sprue bushing of second half of the mold 120 by pushing against the cooled molten plastic formed in hole 304. As a further example and without limitation, remover ring 124 may be actuated by a pneumatic system, wherein the pneumatic system initiates remover ring 124 to pull the sprue from the sprue bushing of second half of the mold 120.

Still referring to FIG. 9, second half of the mold 120 may include sprue bushing 128. Sprue bushing 128 may include any sprue bushing 128, as described in the entirety of this disclosure. Sprue bushing 128 is configured to include a hollow opening, wherein the hollow opening may include any hollow opening as described above in further detail in reference to FIGS. 1A-B and FIG. 7. Sprue bushing 128 is configured to insert into second side of the mold 120, wherein the hollow opening in sprue bushing 128 creates a hole through second side of the mold 120, as described in further detail throughout the entirety of this disclosure. The end of sprue bushing 128 flush with the top face of second side of the mold 120 includes remover ring 124 inserted outside sprue bushing 128, as described in further detail throughout the entirety of this disclosure. Sprue bushing 128 may include an inner coating, wherein the inner coating may include any inner coating as described above in further detail in reference to FIGS. 1A-B and FIG. 7.

With continued reference to FIG. 9, second side of the mold 120 may include guide ring 132. Guide ring 132 may include any guide ring 132, as described above in further detail in reference to FIGS. 1A-B and FIG. 8. Guide ring 132 is configured to fit to the face opposite the top face of second half of the mold 120, wherein guide ring 132 is secured by sprue bushing 128 being inserted through the opening in guide ring 132, as described above in further detail in reference to FIGS. 1A-B and FIG. 8. Guide ring 132 may be composed of any suitable material, as described in the entirety of this disclosure.

Continuing to refer to FIG. 9, at step 915, system 100 is configured to generate formed product 204. Formed product 204 may include any formed product 204 as described above in further detail in reference to FIGS. 1A-8. Generating formed product 204 is further configured to include filling the opening of the total mold with the molten material, as described above in further detail. The molten material may include any molten material as described above in further detail in reference to FIGS. 1A-8. As described above in further detail in reference to FIGS. 1A-8, the molten material may include any combination of materials suitable for use in the injection molding manufacturing process. The molten material may include an additive, wherein the additive improves the properties of the molten material. Filling the opening of the total mold may include any suitable process of filling the opening of the total mold with the molten material. For example and without limitation, filling the opening of the total mold may include releasing the molten material from the nozzle of the injection molding manufacturing system. The molten material can travel through the hollow opening of sprue bushing 128 and travels to the channels of the first half of the mold 104 and the second half of the mold 120, wherein the channels of first half of the mold 104 and second half of the mold 120 are configured to direct the molten material to properly fill the opening of the total mold. Persons skilled in the art, upon reviewing the entirety of this disclosure, will be aware of various methods of filling which may be suitable for use as methods of filling the opening of the total mold consistently with this disclosure.

Still referring to FIG. 9, generating formed product 204 can include cooling the molten material in the opening of the total mold. Cooling the molten material may be performed utilizing any suitable cooling method, as described in the entirety of this disclosure. For example and without limitation, cooling may include air cooling systems, fluid systems, any combination thereof, and the like. Cooling the molten material may be performed as a manual process, an automated process, a convection process, utilizing cooling lines and/or any combination thereof, as described above in further detail in reference to FIGS. 1A-2B.

With continued reference to FIG. 9, at step 920, system 100 ejects formed part 204 and liner 108 from completed first half of the mold 200. Completed first half of the mold 200 may include any completed first half of the mold 200, as described above in further detail in reference to FIGS. 2A-B. Liner 108 and formed product 204 can be configured to be ejected from completed first half of the mold 200, wherein liner 108 and formed product 204 are attached, as described above in further detail in reference to FIGS. 2A-B. Ejection may include any suitable means for ejection, wherein ejection may be an automated process, a manual process, and/or any combination thereof, as described in further detail throughout the entirety of this disclosure. Ejecting formed product 204 and liner 108 from competed first half of the mold 200 may be further configured to include releasing completed first half of the mold 200 from second half of the mold 120, as described above in further detail in reference to FIGS. 1A-3B. Completed first half of the mold 200 is the combination of first half of the mold 104, liner 108, collar lock 112, alignment pin 116, and a formed product, as described in further detail throughout the entirety of this disclosure. As completed first half of the mold 200 is released from second half of the mold 120, formed product 204 is designed to remain inside liner 108 in completed first half of the mold 200, as described in further detail throughout the entirety of this disclosure. Releasing completed first half of the mold 200 from second half of the mold 120 may include a manual process, an automated process, and/or any combination thereof. For example and without limitation, completed first half of the mold 200 may be clamped to second half of the mold 120 and may be released from second half of the mold 120 by utilizing the press of the injection molding manufacturing system, as described above in further detail in reference to FIGS. 1A-3B.

Still referring to FIG. 9, ejecting liner 108 and formed product 204 is further configured inject a gas into the plenum, wherein injecting the gas causes collar lock 112 and liner 108 to rise out of the completed first half of the mold 200. The gas may include any suitable gas for means of facilitation ejection of liner 108 and finished product 204, as described above in the entirety of this disclosure. For example and without limitation, the gas may include compressed air. The gas is configured, in an embodiment, to fill the plenum, wherein filling the plenum with gas is configured to raise the assembly of collar lock 112 and liner 108, wherein the assembly may include formed product 204. In an embodiment, and without limitation, the alignment pins are configured to guide the motion of the assembly of collar lock 112 and liner 108 lifting away from first half of the mold 104. As the assembly of collar lock 112 and liner 108, including formed product 204, reach the limit of lift, an additional pressure is introduced causing liner 108 to bow outward, as described above in further detail in reference to FIGS. 1A-1B. Injecting a gas into completed first half of the mold 200 is configured to further include injecting the gas through first half of the mold 104 and through liner 108 by use of a release hole of liner 108. The release hole of liner 108 may include any release hole as described in the entirety of this disclosure. The release hole is configured to allow air to flow through liner 108 to the formed product, as described above in further detail in reference to FIGS. 1A-2B. The release hole is designed and configured to facilitate the release of formed product 204 by allowing air to flow in between liner 108 and formed product 204, as described above in further detail in reference to FIGS. 1A-2B. The release hole may include any diameter suitable as a diameter to allow air to flow though liner 108 to formed product 204 but prevents molten material from flowing through liner 108 to formed product 204, as described above in further detail in reference to FIGS. 1A-2B. Persons skilled in the art, upon reviewing the entirety of this disclosure, will be aware of various methods of ejecting which may be suitable for use as methods of ejecting liner 108 and formed product 204 from completed part 200 consistently with this disclosure.

Continuing to refer to FIG. 9, at step 925, system 100 releases formed product 204 from liner 108. Release of formed product 204 may include any suitable method of releasing formed product 204 from liner 108, as described above in further detail in reference to FIGS. 1A-3B. Release of formed product 204 may include a manual process of release, an automated process of release, and/or any combination thereof. In an embodiment, release of formed product 204 from liner 108 may include flexing liner 108 outward to facilitate release of formed product 204, as described above in further detail in reference to FIGS. 1A-3B. Release of formed product 204 is further configured to include, for example and without limitation, repositioning of the assembly of collar lock 112 and liner 108 on the first half of the mold 104, wherein the assembly moves down the at least an alignment pin and is guided back into alignment with first half of the mold 104, as described above in further detail in reference to FIGS. 1A-3B. Persons skilled in the art, upon reviewing the entirety of this disclosure, will be aware of various methods of release which may be suitable for use as the formed product consistently with this disclosure.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A method of producing a product utilizing a liner, the method comprising: guiding, by an injection molding manufacturing system, a collar lock onto a first half of a mold wherein the guiding the collar lock onto the first half of the mold comprises generating a plenum, wherein the collar lock comprises a liner; clamping, at the injection molding manufacturing system, the first half of the mold to a second half of the mold, wherein clamping the first half of the mold to a second half of the mold generates a total mold; generating, by the injection molding manufacturing system, a formed product, wherein generating the formed product further comprises: filling an opening of the total mold with a molten material; ejecting, by the injection molding manufacturing system, the formed product, the collar lock, and the liner from a completed first half of the mold by injecting a gas into the plenum, wherein injecting the gas causes the collar lock and the liner to rise out of the first half of the mold; and releasing, by the injection molding manufacturing system, the formed product from the liner.

2. The method of claim 1, wherein guiding the collar lock onto the first half of the mold further comprises securing the liner to the collar lock.

3. The method of claim 1, wherein the liner is a nickel liner.

4. The method of claim 1, wherein the liner further comprises at least a release hole, wherein the at least a release hole is configured to allow a gas of an environment to flow through the liner to the formed product.

5. The method of claim 1, wherein the second half of the mold further comprises:
a sprue bushing; and
a guide ring.

6. The method of claim 1, wherein generating the formed product further comprises cooling the molten material in the opening of the total mold utilizing at least a cooling line in the first half of the mold of the part.

7. The method of claim 1, wherein the gas is compressed air.

8. A method of producing a product utilizing a liner, the method comprising: guiding, by an injection molding manufacturing system, a first collar lock onto a first half of a mold, wherein the first collar lock comprises a first liner; guiding, by an injection molding manufacturing system, a second collar lock onto a second half of the mold, wherein the second collar lock comprises a second liner; clamping, at the injection molding manufacturing system, the first half of the mold to a second half of the mold, wherein clamping the first half of the mold to a second half of the mold generates a total mold; generating, by the injection molding manufacturing system, a formed product, wherein generating the formed product further comprises: filling an opening of the total mold with a molten material; ejecting, by the injection molding manufacturing system, the formed product from a completed first half of the mold and a completed second half of the mold wherein ejecting the formed product and the liner further comprises: injecting a gas into a first plenum, wherein injecting the gas causes the first collar lock and the first liner to rise out of the first half of the mold, and injecting the gas into a second plenum, wherein injecting the gas causes the second collar lock and the second liner to rise out of the second half of the mold; and releasing, by the injection molding manufacturing system, the formed product from the first liner and the second liner.

* * * * *